(12) United States Patent
Leviness et al.

(10) Patent No.: US 6,284,807 B1
(45) Date of Patent: *Sep. 4, 2001

US006284807B1

(54) SLURRY HYDROCARBON SYNTHESIS PROCESS WITH INCREASED CATALYST LIFE

(75) Inventors: Stephen C. Leviness, Plano, TX (US); Charles J. Mart, Baton Rouge, LA (US); William C. Behrmann, Baton Rouge, LA (US); Stephen J. Hsia, Baton Rouge, LA (US); Daniel R. Neskora, Baton Rouge, LA (US)

(73) Assignee: Exxon Research and Engineering Company, Annandale, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,304

(22) Filed: Aug. 14, 1998

Related U.S. Application Data

(63) Continuation of application No. 08/850,355, filed on May 2, 1997, now abandoned, which is a continuation-in-part of application No. 08/797,368, filed on Feb. 7, 1997, now Pat. No. 6,107,353, which is a continuation-in-part of application No. 08/636,425, filed on Apr. 23, 1996, now abandoned, which is a continuation-in-part of application No. 08/512,734, filed on Aug. 5, 1995, now abandoned.

(51) Int. Cl.$^7$ ............... C07C 1/04; B01J 38/10; B01J 23/96

(52) U.S. Cl. ............... 518/710; 518/715; 585/733; 585/638; 502/30; 502/31; 502/53

(58) Field of Search .................. 585/733, 638; 518/700, 715, 710; 502/30, 31, 53

(56) References Cited

U.S. PATENT DOCUMENTS

| | | | |
|---|---|---|---|
| 4,052,477 | * 10/1977 | Ireland et al. | 260/676 R |
| 4,542,122 | 9/1985 | Payne et al. | 502/325 |
| 4,568,663 | 2/1986 | Mauldin | 502/325 |
| 4,599,481 | * 7/1986 | Post et al. | 585/700 |
| 4,621,072 | 11/1986 | Arntz et al. | 502/178 |
| 4,663,305 | 5/1987 | Mauldin et al. | 502/304 |
| 4,769,224 | 9/1988 | van Grinsven et al. | 423/236 |
| 4,888,131 | 12/1989 | Goetsch | 252/373 |
| 5,068,254 | * 11/1991 | Posthuma et al. | 518/705 |
| 5,160,456 | 11/1992 | Lahn et al. | 252/373 |
| 5,260,239 | 11/1993 | Hsia | 502/30 |
| 5,268,344 | 12/1993 | Pedrick et al. | 502/30 |
| 5,283,216 | * 2/1994 | Mitchell | 502/30 |
| 5,348,982 | 9/1994 | Herbolzheimer et al. | 518/700 |
| 5,463,168 | 10/1995 | Audeh et al. | 585/854 |
| 5,543,437 | * 8/1996 | Benham et al. | 518/700 |
| 5,545,674 | 8/1996 | Behrmann et al. | 518/715 |

FOREIGN PATENT DOCUMENTS 0700717   3/1996  (EP) .......... 23/28

* cited by examiner

Primary Examiner—Bekir L. Yildirim
(74) Attorney, Agent, or Firm—Jay Simon

(57) ABSTRACT

A slurry catalytic hydrocarbon synthesis process which employs a catalyst comprising a supported cobalt component achieves a short term catalyst half life of more than 10 days, by using a syngas feed which contains less than fifty parts per billion of a combined total amount of HCN and $NH_3$.

16 Claims, No Drawings

SLURRY HYDROCARBON SYNTHESIS PROCESS WITH INCREASED CATALYST LIFE

CROSS-REFERENCE TO RELATED APPLICATIONS

This application is a continuing application of U.S. Ser. No. 08/850,355 filed on May 2, 1997 (abandoned), which was a continuation-in-part application of U.S. Ser. No. 08/797,368 filed on Feb. 7, 1997 which is now U.S. Pat. No. 6,107,353, and which, in turn, was a continuation-in-part of U.S. Ser. No. 08/636,425 (abandoned) and Ser. No. 08/512,734 (abandoned), respectively filed on Apr. 23, 1996 and Aug. 5, 1995.

BACKGROUND OF THE DISCLOSURE

1. Field of the Invention

The invention relates to a hydrocarbon synthesis process with increased catalyst life. More particularly, the invention relates to a slurry catalytic hydrocarbon synthesis process employing a supported cobalt metal catalyst in which catalyst half life is increased by using a syngas feed containing less than fifty parts per billion of nitrogenous, catalyst deactivating species.

2. Background of the Invention

Slurry hydrocarbon synthesis (HCS) processes are known. In a slurry HCS process a synthesis gas (syngas) comprising a mixture of $H_2$ and CO is bubbled up as a third phase through a slurry in a reactor in which the slurry liquid comprises hydrocarbon products of the synthesis reaction and the dispersed, suspended solids comprise a suitable Fischer-Tropsch type hydrocarbon synthesis catalyst. Reactors which contain such a three phase slurry are sometimes referred to as "bubble columns", as is disclosed in U.S. Pat. No. 5,348,982. Irrespective of whether the slurry reactor is operated as a dispersed or slumped bed, the mixing conditions in the slurry will typically be somewhere between the two theoretical conditions of plug flow and back mixed. It is also known that Fischer-Tropsch type catalysts useful for forming hydrocarbons from a syngas are rapidly, but reversibly deactivated by certain nitrogenous species in the syngas feed, particularly HCN and $NH_3$. Syngas made from hydrocarbon feedstocks which contain nitrogen (i.e., natural gas) or nitrogen containing compounds (i.e., resids, coal, shale, coke, tar sands, etc.) invariably contains HCN and $NH_3$ which contaminate the reactive slurry and deactivate the catalyst. Certain oxygenates and carbonaceous compounds which are formed in the slurry as by-products of the HCS reaction are also believed to cause rapid deactivation. Deactivation of such catalysts by HCN and $NH_3$ may be reversed and catalytic activity restored (rejuvenated) by contacting the deactivated catalyst with hydrogen or a hydrogen containing gas (rejuvenating gas). Deactivation of such catalysts by these species is reversible and catalytic activity is restored (the catalyst rejuvenated) by contacting the deactivated catalyst with hydrogen either continuously or intermittently as is disclosed, for example, in U.S. Pat. Nos. 5,260,239; 5,268,344 and 5,283,216. While methods have been suggested for reducing the HCN and $NH_3$ content of syngas down to about 0.1 ppm (100 ppb) by catalytic hydrolysis (U.S. Pat. No. 4,769,224) and chemical scrubbing (U.S. Pat. No. 5,068,254), it has now been found that even as little as 100 vppb of a combined total of HCN and $NH_3$ in the syngas will result in a catalyst half life of only four days for the case of a supported Co metal catalyst in an HCS slurry. It has now been found that reducing the level of the HCN and $NH_3$ catalyst poisons in the syngas below 50 ppb produces increased catalyst life and requires less catalyst rejuvenation. A method for achieving such low levels has also been found and is disclosed in U.S. Pat. No. 6,107,353.

SUMMARY OF THE INVENTION

The present invention relates to a slurry hydrocarbon synthesis (HCS) process employing a supported cobalt metal catalyst in which the short term catalyst half life is at least 10 days, preferably at least 30 and more preferably at least 40 or more days. By short term half life is meant that the catalytic activity caused by reversible deactivation of the catalyst is 50% that of fresh catalyst and that this loss is substantially restored (the catalyst rejuvenated) by contacting the deactivated catalyst with a rejuvenating gas comprising $H_2$. Catalyst activity is defined in terms of the CO conversion to hydrocarbons. Thus, if under a given set of HCS conditions fresh catalyst produces a CO conversion of 80 mole %, the catalyst half life is realized when the conversion drops to 40%, as a result of contact with the reversibly deactivating nitrogenous species in the synthesis gas (syngas) feed. By reversibly deactivating nitrogenous species is meant HCN, $NH_3$ and mixture thereof. It is also an embodiment of the process of the invention that the catalyst will have a long term half life of at least 100 days and preferably at least 200 days. It has been found that there is also an unrejuvenable catalyst activity loss which occurs over time, which cannot be restored by contacting the catalyst with $H_2$, but which can be restored by regeneration. The unrejuvenable, but regenerable loss in catalyst activity drops continuously, so that eventually the catalyst has a CO conversion activity at its long term half life only half or 50% of fresh catalyst and this long term activity loss cannot be restored (the catalytic activity cannot be rejuvenated) by contacting the deactivated catalyst with $H_2$ or a $H_2$ containing rejuvenating gas. Thus, by long term half life is meant the time it takes the catalyst to have only half the activity of fresh catalyst and that this activity loss, while reversible, is not restored by a rejuvenation process in which the deactivated catalyst is contacted with $H_2$ or an $H_2$ containing gas. Instead, the catalyst has to be separated from the slurry and regenerated by processes that include oxidation or burning, rereduction of the catalytic metal(s) and, optionally, passivation in CO and/or syngas. Thus, long term loss of catalyst activity in the context of the invention is regenerable, but not rejuvenable with $H_2$. Further, regenerable activity loss is different from irreversible catalyst activity loss due to, for example, sulfur poisoning, which requires catalyst replacement. The relatively long short term and long term catalyst life in the practice of the invention is achieved by using a syngas feed in which the total level of the catalyst deactivating nitrogenous species HCN, $NH_3$ and mixture thereof is less than 50 vppb (volume parts per billion), preferably less than 20 vppb, and still more preferably less than 10 vppb. A slurry HCS catalyst useful in the practice of the invention comprises a catalytically active cobalt component dispersed and supported on a particulate inorganic refractory oxide carrier or support, and preferably as a thin catalytically active surface layer, ranging in thickness from about 5–200 microns. It is also preferred that the catalyst have a productivity of at least 150 $hr^{-1}$ at 200° C., preferably at least 500 $hr^{-1}$ and more preferably at least 1000 $hr^{-1}$. By productivity is meant the standard volume of CO converted per volume of catalyst per hour. In a further embodiment, the catalyst employed in the process of the invention will have a methane selectivity of less than 10 mole % and preferably less than 5 mole %. This means that less than 10% of the CO converted is converted to methane. In one embodiment the catalyst comprises catalytically effective amounts of Co and one or more of Re, Ru, Fe, Ni, Th, Zr, Hf, U, Mg and La on a suitable inorganic support material, and preferably one which comprises one or more refractory metal oxides. Preferred supports for Co containing catalysts comprise titania and titania-silica composites, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674, with those disclosed in U.S. Pat. No. 5,545,674 being particularly preferred.

An HCS slurry process of the invention comprises reacting a syngas which contains HCN, $HN_3$ or mixture thereof in the presence of a solid, particulate HCS catalyst in a slurry which comprises the catalyst and gas bubbles in a hydrocarbon slurry liquid, at reaction conditions effective to produce hydrocarbons from the syngas, wherein the total amount of HCN, $HN_3$ or mixture thereof in the syngas is less than 50 vppb, preferably less than 20 vppb and more preferably less that 10 vppb to achieve a short term catalyst half life greater than 10 days, preferably greater than 30 days and more preferably greater than 40 days, and with a long term catalyst half life greater than 100 and preferably greater than 200 days. Those skilled in the art will appreciate the unusually large difference in catalyst half life resulting from a relatively small difference in concentration of the HCN and $NH_3$ catalyst deactivating species in the syngas feed. It was not known that the relatively small differences and extremely low concentrations of HCN and $NH_3$ in the syngas feed would make such a large difference in catalyst half life. The increased catalyst half life reduces catalyst rejuvenation requirements and concomitant hydrogen consumption, while maintaining good productivity and selectivity to liquid hydrocarbon products. The process of the invention has been demonstrated with a slurry HCS process in which the syngas is bubbled up through a three phase HCS slurry comprising the particulate catalyst and gas bubbles in a hydrocarbon slurry liquid, and in which the catalyst comprised a catalytically active cobalt component dispersed and supported on a particulate inorganic refractory oxide carrier or support, as a thin catalytically active surface layer which met the above requirements for productivity and methane make. This catalyst was of the type disclosed and claimed in the '674 patent referred to above.

A number of methods have been found to achieve the low concentration of the HCN to $NH_3$ in the syngas useful in the practice of the invention. These include catalytic hydrolysis of the HCN to $NH_3$, followed by scrubbing with water to dissolve out the $NH_3$ and, optionally, the use of guard beds containing one or more solid adsorbents, preferably acidic, to adsorb any HCN and $NH_3$ that may break through. This process is disclosed in U.S. Pat. No. 6,107,353 referred to above. Another method comprises cryogenic separation of nitrogen from natural gas used as a syngas feed, so that not enough nitrogen is present in the natural gas to produce the catalyst deactivating species in the syngas generating unit. In this process too, solid adsorbent beds will be placed between the syngas generation and the HCS reactor(s), in the event of a nitrogen break through upstream of the syngas generating unit and result in increasing the concentration of the catalyst deactivating species in the syngas. In a more specific embodiment of a slurry HCS process, the invention comprises reacting a synthesis gas comprising a mixture of $H_2$ and CO and containing HCN, $NH_3$ or mixture thereof, in the presence of a hydrocarbon synthesis catalyst in a slurry comprising said catalyst and gas bubbles in a hydrocarbon slurry liquid, under reaction conditions effective to form hydrocarbons from said syngas, said catalyst comprising a catalytically active cobalt component dispersed and supported on a particulate inorganic refractory oxide carrier or support, as a thin catalytically active surface layer, said catalyst having a productivity of at least 150 $hr^{-1}$ and less than 5 mole % methane make from said synthesis gas, and wherein the amount of said HCN, $NH_3$ or mixture thereof present in said gas is less than 50 vppb so as to achieve a short term catalyst half life of at least 10 days. The hydrocarbon slurry liquid comprises hydrocarbon products of the HCS reaction which are liquid at the reaction conditions and a portion is continuously or intermittently withdrawn from the slurry HCS reactor as long as the hydrocarbons are being produced. The hydrocarbon liquid withdrawn from the reactor comprises $C_{5+}$, primarily paraffinic hydrocarbons and is typically upgraded into more valuable products by one or more conversion operations, or sold neat. As the HCS reaction progresses, the catalyst loses activity due to the presence of the HCN, $NH_3$ or mixture thereof in the syngas and must be either continuously or intermittently rejuvenated by bubbling $H_2$ or an $H_2$ containing gas up through the slurry in which it contacts the catalyst and at least partially, and preferably substantially completely, restores the catalytic activity, as is disclosed in the prior art referred to above and more preferably after all or at least a portion of the CO has been removed from the slurry.

DETAILED DESCRIPTION

In a Fischer-Tropsch slurry HCS process, a syngas comprising a mixture of $H_2$ and CO is bubbled up into a reactive slurry in which it is catalytically converted into hydrocarbons and preferably liquid hydrocarbons. The mole ratio of the hydrogen to the carbon monoxide may broadly range from about 0.5 to 4, but which is more typically within the range of from about 0.7 to 2.75 and preferably from about 0.7 to 2.5. The stoichiometric mole ratio for a Fischer-Tropsch HCS reaction is 2.0, but there are many reasons for using other than a stoichiometric ratio as those skilled in the art know and a discussion of which is beyond the scope of the present invention. In a slurry HCS process the mole ratio of the $H_2$ to CO is typically about 2.1/1. Slurry HCS process conditions vary somewhat depending on the catalyst and desired products. Typical conditions effective to form hydrocarbons comprising mostly $C_{5+}$ paraffins, and preferably $C_{10+}$ paraffins (e.g., $C_{5+}-C_{200}$), in a slurry HCS process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (0° C., 1 atm) per hour per volume of catalyst, respectively. Slurry catalyst rejuvenation conditions of temperature and pressure are similar to those for hydrocarbon synthesis and are disclosed in the prior art. The syngas may be formed by various means, including contacting a hot carbonaceous material such as coke or coal, with steam, or from a feed comprising methane. A feed comprising methane is preferred for convenience, cleanliness and because it doesn't leave large quantities of ash to be handled and disposed of. The methane containing gas feed is obtained from natural gas or by burning coal, tar, liquid hydrocarbons and the like and is fed into a syngas generator. The production of syngas from methane by either partial oxidation, steam reforming or a combination thereof is well known as is disclosed, for example, in U.S. Pat. No. 4,888,131. In many cases it is preferred to catalytically partially oxidize and steam reform the methane in a fluid bed syngas generating unit (FBSG) as is disclosed, for example, in U.S. Pat. Nos. 4,888,131 and 5,160,456. Irrespective of the source of the methane, nitrogen or nitrogen containing compounds are present in the methane containing gas fed into the syngas generator, some of which are converted into $NH_3$ and HCN during the syngas formation. These will deactivate a Fischer-Tropsch HCS catalyst, particularly those comprising Co as the catalytic metal. As the prior art teaches, deactivation by these species is reversible and the catalyst can be rejuvenated by contacting it with hydrogen. This restoration of the catalytic activity of a reversibly deactivated catalyst is referred to as catalyst rejuvenation and is disclosed, for example, in the U.S. Pat. Nos. 5,260,239; 5,268,344 and 5,283,216 patents referred to above. It has also been found that both the short term and long term catalyst half life of a Co containing slurry HCS catalyst are unacceptably short unless the combined amount of the HCN and $NH_3$ present in the syngas being fed into an HCS reactor is less than 50 vppb, preferably less than 20 vppb and more preferably less than 10 vppb, so that the short term or $H_2$ rejuvenable catalyst half life will be at least 10 days, preferably at least 30 days and more preferably at least 40 days and for the long term catalyst half life to be at least 100 days and preferably at least 200 days. As mentioned above, with a Co metal containing HCS catalyst of the type disclosed and claimed in U.S. Pat. No. 5,545,674 in a reactive HCS slurry, 100 vppb of a combined total of HCN and $NH_3$ present in the syngas results in the catalyst having a half life of only 4 days. By half life is meant that the overall activity of the catalyst body is reduced by 50% in 4 days. An activity level of 50% is totally unacceptable. It means that the productivity of the catalyst (and, concomitantly the reactor), measured in terms of CO conversion, is only 50% of what it should be in 4 days. A productivity level of at least 90% is desired. This means that in cyclic or batchwise rejuvenation, the reactor is taken off-line for one-quarter of each day to maintain the activity level at no less than about 90%, during which time the catalyst in the reactor is rejuvenated with hydrogen. As a practical matter, the reactor is off-line more than one-quarter of each day, due to the time it takes to purge out the syngas, pass in the hydrogen or hydrogen containing catalyst rejuvenating gas and then restart the HCS reaction. This results in a continuous average 25% loss of hydrocarbon production from the reactor, even with rejuvenation. Further, as the catalyst deactivates at otherwise constant conditions, the conversion level drops resulting in a decrease in liquid hydrocarbon make and a small increase in methane make. Alternatively, conversion can be held relatively constant despite the catalyst deactivation, by increasing the reactor temperature, but this results in a relatively large increase in methane make and consequent decrease in liquid product make. At a combined HCN and $NH_3$ level of about 20 vppb in the syngas, the catalyst half life is 20 days. This means that about every fourth day the catalyst has to be rejuvenated, using the same amount of time and hydrogenation for the rejuvenation as for the case above, yielding an average production loss of only about 6%. At about 40–50 vppb, it is about 15%. At a combined level of about 10–12 vppb, the catalyst half life is about 40 days and the catalyst has to be rejuvenated for one-quarter of a day only every 8 days, yielding a productivity loss of only about 3%. The catalyst half life is about 30 days when the combined amounts of HCN and $NH_3$ is about 13–17 vppb. In the case of a slurry HCS process, the catalyst in the slurry can be either continuously rejuvenated with the reactor remaining on-line using the methods disclosed in U.S. Pat. Nos. 5,260,239 and 5,268,344. Nevertheless, the case of a catalyst half life of only 4 days will still consume five times more hydrogen rejuvenation gas than if the half life were 20 days, and ten times the amount required for a 40 day half life.

While prior art methods have included catalytic hydrolysis and chemical scrubbing for reducing the synthesis gas HCN content to 0.01 vol. % or 100 vppb, even 100 vppb of HCN in the syngas is an unacceptably high level. Further, HCN removal by alkaline scrubbing and with alkaline ferrous sulphate solutions is hampered by the presence of other acidic materials in the syngas, particularly $CO_2$. Washing with water which contains chemicals is further disadvantaged by process complexity, costly chemical consumption, and waste disposal demands. Also, while $NH_3$ is water soluble, HCN is not soluble enough in water to be able to remove it down to the low levels of less than 50 vppb, preferably less than 20 vppb and more preferably less than 10 vppb required to achieve reasonable levels of catalyst half life. Chemical scrubbing processes are not selective enough to remove the HCN down to these levels. Some prior art catalytic conversion processes have employed relatively low activity catalysts which require excessive catalyst volume and/or high processing temperatures. Other processes have employed sulfided catalysts which will leak out sulfur and irreversibly deactivate an HCS catalyst downstream. Processes which rely primarily or solely on adsorption to remove the HCN and $NH_3$ require impracticably large quantities of adsorbent to achieve useful operating times to reduce the combined HCN and $NH_3$ concentration to the desired levels. The methods disclosed in the copending patent applications referred to above are preferred for achieving the low levels of HCN and $NH_3$ required for acceptable catalyst half life.

In a slurry HCS process according to the practice of the invention, liquid and gaseous hydrocarbon products are formed by contacting a syngas comprising a mixture of $H_2$ and CO with a Fischer-Tropsch type of HCS catalyst, under shifting or non-shifting conditions and preferably under non-shifting conditions in which little or no water gas shift reaction occurs, particularly when the catalytic metal comprises Co, Ru or mixture thereof Suitable Fischer-Tropsch reaction types of catalyst comprise, for example, one or more Group VIII catalytic metals such as Fe, Ni, Co, Ru and Re. Particularly preferred in the practice of the invention is a catalyst in which the catalytic metal comprises a catalytically active cobalt component dispersed and supported on a particulate inorganic refractory oxide carrier or support, with the total thickness of the catalytically active layer in the range of from about 5–200 microns. For support particles of a diameter greater than these values, the metal will be impregnated as a thin surface layer no thicker than this range. For support particles smaller than the upper limit of this range, the catalytic metal may be either uniformly impregnated throughout the particles or deposited as a thin(ner) surface layer. Paraffinic, $C_{5+}$ hydrocarbon products are preferred and preferably more than 50% of the $C_{5+}$ hydrocarbons will be paraffins. Preferably the catalyst will have a productivity in excess of 150 $hr^{-1}$ at 200° C. and exhibit a methane selectivity of less than 10%. More specifically and as set forth above, the catalyst comprises catalytically effective amounts of Co and one or more of Re, Ru, Fe, Ni, Th, Zr, Hf, U, Mg and La on a suitable inorganic support material, and preferably one which comprises one or more refractory metal oxides. Preferred supports for Co containing catalysts comprise titania and titania-silica composites, particularly when employing a slurry HCS process in which higher molecular weight, primarily $C_{5+}$ paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674, with those disclosed in U.S. Pat. No. 5,545,674 being particularly preferred.

The hydrocarbons produced by an HCS process according to the invention are typically upgraded to more valuable products, by subjecting all or a portion of the $C_{5+}$ hydrocarbons to fractionation and/or conversion. By conversion is meant one or more operations in which the molecular structure of at least a portion of the hydrocarbon is changed and includes both noncatalytic processing (e.g., steam cracking), and catalytic processing (e.g., catalytic cracking) in which a fraction is contacted with a suitable catalyst. If hydrogen is present as a reactant, such process steps are typically referred to as hydroconversion and include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A slurry hydrocarbon synthesis process, with reduced rejuvenation hydrogen consumption, for making hydrocarbons from a synthesis gas comprising a mixture of $H_2$ and CO which also contains HCN, $NH_3$ or mixture thereof, said process comprising passing said synthesis gas into a slurry hydrocarbon synthesis reactor and reacting said $H_2$ and CO in the presence of a hydrocarbon synthesis catalyst in a slurry comprising said catalyst and gas bubbles in a hydrocarbon slurry liquid, under reaction conditions effective to form hydrocarbons from said $H_2$ and CO, at least a portion of which are liquid at said reaction conditions and comprise said slurry liquid, wherein said HCN, $NH_3$ or mixture thereof reversibly deactivates said catalyst and causes it to lose a portion of its catalytic activity, and wherein at least a portion of said lost catalytic activity is restored by contact with hydrogen in-situ in said slurry liquid, said catalyst comprising a catalytically active metal component and a particulate inorganic refractory oxide support component, and wherein the total amount of said HCN, $NH_3$ or mixture thereof present in said synthesis gas passed into said reactor is less than 20 vppb, to achieve a reversibly deactivated short term catalyst half life of at least 20 days.

2. A process according to claim 1 wherein said catalyst exhibits a productivity of at least 150 $hr^{-1}$.

3. A process according to claim 2 wherein said synthesized hydrocarbons which are liquid at the synthesis reaction temperature and pressure comprise primarily $C_{5+}$ paraffinic hydrocarbons.

4. A process according to claim 3 wherein said catalyst exhibits less than 10 mole % methane selectivity.

5. A process according to claim 4 wherein said catalytically active metal component comprises cobalt.

6. A process according to claim 5 wherein said support component comprises titania.

7. A process according to claim 6 wherein said total amount of said HCN, $NH_3$ or mixture thereof present in said synthesis gas fed into said reactor is less than 10 vppb, to achieve a catalyst short term half life greater than 40 days.

8. A process according to claim 7 wherein said catalyst productivity is at least 500 $hr^{-1}$.

9. A method for increasing the productivity of a hydrocarbon synthesis reactor producing hydrocarbons from a synthesis feed gas comprising a mixture of $H_2$ and CO, by passing said feed gas into said reactor, in which said $H_2$ and CO react in the presence of a hydrocarbon synthesis catalyst therein at reaction conditions effective to produce hydrocarbons, a portion of which are liquid at the reaction conditions, wherein said feed gas contains $NH_3$, HCN or mixture thereof in a total amount of greater than 20 vppb which reversibly deactivates said catalyst to produce a catalyst short term half life of less than 20 days, and wherein said catalytic activity is at least partially restored by continuously or intermittently rejuvenating said reversibly deactivated catalyst with hydrogen, said method comprising producing a synthesis gas having a total amount of said $NH_3$, HCN or mixture thereof of less than 20 vppb, before it is passed into said reactor, to achieve a catalyst short term half life of at least 20 days, and thereby increase said reactor productivity.

10. A process according to claim 9 wherein said catalyst exhibits a productivity of at least 150 $hr^{-1}$.

11. A process according to claim 10 wherein said synthesized hydrocarbons which are liquid at the synthesis reaction temperature and pressure comprise primarily $C_{5+}$ paraffinic hydrocarbons.

12. A process according to claim 11 wherein said catalyst exhibits less than 10 mole % methane selectivity.

13. A process according to claim 12 wherein said catalyst comprises a catalytically active cobalt metal component.

14. A process according to claim 13 wherein said catalyst includes a titania support component.

15. A process according to claim 14 wherein said total amount of said HCN, $NH_3$ or mixture thereof present in said synthesis gas fed into said reactor is less than 10 vppb, to achieve a catalyst short term half life greater than 40 days.

16. A process according to claim 15 wherein said catalyst productivity is at least 500 $hr^{-1}$.

* * * * *